United States Patent [19]

Kercheville

[11] 4,280,915

[45] Jul. 28, 1981

[54] SALT STABLE LUBRICANT FOR WATER BASE DRILLING FLUIDS

[75] Inventor: James D. Kercheville, Houston, Tex.

[73] Assignee: NL Industries, Inc., New York, N.Y.

[21] Appl. No.: 809,369

[22] Filed: Jun. 23, 1977

[51] Int. Cl.$^3$ .............................................. C09K 7/00
[52] U.S. Cl. ................................. 252/8.5 C; 252/49.3; 252/51.5 A
[58] Field of Search ............... 252/8.5 C, 8.5 P, 49.3, 252/49.5, 51.5 A

[56] References Cited

U.S. PATENT DOCUMENTS

| | | | |
|---|---|---|---|
| 3,630,898 | 12/1971 | Teeter et al. | 252/8.5 C |
| 3,761,410 | 9/1973 | Mondshine et al. | 252/49.3 |

Primary Examiner—J. L. Barr
Attorney, Agent, or Firm—Gary Nath

[57] ABSTRACT

A water base drilling fluid having enhanced lubricating properties in the presence of polyvalent cations comprising a mixture of (1) water; (2) finely divided inorganic solids; (3) an alkanolamide of a saturated fatty acid having 8 to 20 carbon atoms, or triglycerides thereof, and (4) an alkanolamide of an unsaturated fatty acid having 18 carbon atoms, or triglycerides thereof.

15 Claims, No Drawings

SALT STABLE LUBRICANT FOR WATER BASE DRILLING FLUIDS

This invention relates to water base drilling fluids having enhanced lubricating properties and drilling processes employing the same.

When wells are drilled with rotary drilling equipment, a drilling fluid is circulated down the drill pipe to the bit and back up the hole to the surface is an annular space between the drill pipe and the borehole wall.

The drilling fluid performs many functions which are vital to the success of the drilling process. One of these functions is the lubrication of the bearings and the cutting surfaces of the drill bit. Lubrication also decreases the torque and power requirements necessary to rotate the drill pipe within the borehole. Despite the improved lubricating characteristics of drilling fluids resulting from newly developed additives, numerous disadvantages remain which limit the fluids overall effectiveness. For example, some of the fluid additives are not effective a pH values above 10.5 whereas other additives are not effective in the presence of calcium, magnesium or other polyvalent cations. In addition, some additives cause the drilling fluid to foam while others are difficult, if not impossible, to disperse.

A water base drilling fluid has een unexpectedly discovered which has enhanced lubricating properties in the presence of polyvalent cations comprising a mixture of (1) water; (2) finely divided inorganic solids; (3) an alkanolamide of a saturated fatty acid having 8 to 20 carbon atoms, or triglycerides thereof, and (4) an alkanolamide of an unsaturated fatty acid having 18 carbon atoms, or triglycerides thereof.

A lubricating composition has also been unexpectedly discovered for a water base drilling fluid containing polyvalent cations, which when dispersed as discrete droplets in said fluid increases the fluid's lubricity comprising a mixture of (a) an alkanolamide of a saturated fatty acid or triglycerides thereof wherein the fatty acid has 8 to 20 carbon atoms and said alkanolamide contains mono- or ki- alkanol radicals with 1 to 10 carbon atoms; and (b) sufficient amounts of an alkanolamide of an unsaturated fatty acid, or triglycerides thereof wherein the fatty acid has 18 carbon atoms and said alkanolamide contains mono- or di- alkanolradicals with 1 to 10 carbon atoms.

The term "drilling fluid" as used herein refers to any liquid used as the circulating medium in a rotary drilling process. The drilling fluid may be clear water substantially free of suspended solids, which fluids are commonly used in drilling the hard formations in West Texas. Likewise the drilling fluids can be prepared by dispersing inorganic solids such as native clays in water in concentrations as high as 20% or more by weight of the drilling fluid. The clays may be selected from a wide range of materials, such as montmorillonite, attapulgite, or kaolinite type clays. Synthetic clays, such as synthetic zeolites, can also be used.

The term "water base" distinguishes the inventive drilling fluid from fluids employing oil-in-water emulsion drilling fluids and oil base drilling fluids. This term conventionally means drilling fluids which do not have intentionally added hydrocarbon oil to the drilling fluid. The ability to prepare a water base drilling fluid having excellent lubricating properties without the addition of hydrocarbon oil is truly unexpected. It should be recognized, however, that the novel compositions of this invention remain effective even if oil enters the drilling fluid, for example, through the formation being drilled.

The term "lubricity" as used herein refers to the lubrication characteristic of the drilling fluid in contact with the drill pipe, drill collars, and borehole walls. A drilling fluids' lubricity is determined by measuring the coefficient of friction between two sliding surfaces separated by the drilling fluid, by measuring the torque between a rotating surface and a stationary surface separated by the drilling fluid, or by measuring the power required to rotate one surface in proximity to a stationary surface separated by the drilling fluid. An improvement in drilling fluid lubricity will be indicated by a decrease in the coefficient of friction, a decrease in torque, and a decrease in the power required to rotate the drill pipe.

Conventional rotary drilling techniques are employed in the process of using the novel drilling fluids of this invention. One technique involves pumping the drilling fluid down the hole through a drill pipe and discharge the fluid from the bit against the bottom of the hole. The drilling fluid picks up and carries the cuttings through an annular space surrounding the pipe to the surface where equipment separates the cuttings from the drilling fluid. If desired, reverse circulation of the drilling fluid can be employed. It is contemplated that other conventional circulation processes may also be employed.

The lubricating composition can be added to the water base drilling fluid in any conventional manner such as in surface mixing tanks or the ingredients of the composition are added separately and subsequently blended.

The novel lubricating compositions of this invention contain as essential ingredients an alkanolamide of a saturated fatty acid having 8 to 20 carbon atoms and/or triglycerides thereof, and an alkanolamide of an unsaturated fatty acid having 18 carbon atoms and/or triglycerides thereof.

While the saturated fatty acids may contain 8 to 20 carbon atoms, preferred saturated fatty acids are lauric acid, myristic acid, palmitic acid, and stearic acid with lauric acid being most preferred. The triglycerides may be naturally occurring or synthetic. The naturally occurring triglycerides, however, must contain over 50% by weight saturated fatty acids to be effective, such as found in coconut oil and palm kernel oil.

Preferred unsaturated fatty acids have 16 to 18 carbon atoms and the most preferred which are oleic acid, linoleic acid and linolenic acid. The triglycerides may be naturally occurring or synthetic with naturally occurring triglycerides preferably selected from castor oil, soybean oil, cotton seed oil, sunflower oil, corn oil, olive oil, palm oil, peanut oil, linseed oil, and tall oil with soybeam oil being most preferred. In addition, tallow, lard and cod liver oil may also be employed as a source of unsaturated fatty acids.

The alkanolamides of the fatty acids employed in the invention can be selected from a wide range of compounds having a mono- or di- alkanol radicals with 1 to 10 carbon atoms and preferably 1 to 5 carbon atoms which compounds must be reactive with saturated and unsaturatd fatty acids. In addition, the alkanolamides must be water insoluble yet readily dispersible in a water environment. Exemplary alkanolaides may be prepared from methanolamide, dimethanolamine, ethanolamine, diethanolamine, n-propanolamine, di-n- propanolamine, isopropanolamine, n-butanol-amine, isobutanolamine with diethanolamine being preferred.

The preferred saturated fatty acid/alkanolamide is the diethanolamide of coconut oil. The preferred unsaturated fatty acid/alkanolamide is diethanolamide of soybean oil wherein 8 to 13% by weight of the unsaturated product is the alkanolamine.

The amount of alkanolamine reacted with the saturated and unsaturated fatty acid will vary with the particular compounds and reaction conditions.

The same alkanolamine is preferably employed with both saturated and unsaturated fatty acid.

The amount of alkanolamine employed may be readily determined by the ordinary skilled artisan without undue experimentation. In general, the alkanolamine concentration ranges from 5% to 15% by weight of the final composition which amount is sufficient to produce an acceptable lubricant, and preferably from 7% to 10% by weight. The unsaturated fatty acid, however, should not be reacted with excess amounts of alkanolamine, that is, amounts in excess of 13% by weight, or amounts too small, that is, amounts less than 8% by weight. Large amounts may cause flocculation of mud solids when the product is added to the drilling fluid, whereas small amounts do not permit adequate dispersibility. An excess amount of unreacted fatty acid in the final product is desirable to prevent the flocculation effect.

A small but effective amount of a mixture containing the reacted fatty acids is employed in a water base drilling fluid containing polyvalent cations to improve the fluids' lubricity. These amounts may range from 1% to 10% by weight of the saturated fatty acid/alkanolamide and/or triglycerides thereof, and 60% to 99% by weight of the unsaturaed fatty acid/alkanolamide and/or triglycerides thereof. Preferably, the mixture contains 2% to 5% by weight of te saturated fatty acid/alkanolamide and 95% to 98% by weight of the unsaturated fatty acid/alkanolamide. While it is recognized that amounts of the saturated fatty acid/alkanolamide and triglycerides thereof may range from 1% to 10% by weight, amounts less than 2% by weight are not preferred since these may not be effective in preventing insoluble soap formation during use. In contrast, amounts greater than 5% while effective may not be efficient in preventing foaming problems when in use.

The preferred drilling fluid of the invention contains a mixture of 4% to 5% by weight of an alkanolamide of a saturated fatty acid and/or triglycerides thereof, 75% to 86% by weight of an alkanolamide of an unsaturated fatty acid and/or triglycerides thereof, and 10% to 20% by weight of a pour point depressant. The drilling fluids of this invention and particularly the preferred drilling fluid result in maintaining a marked reduction of friction between the drill pipe and the borehole wall even in the presence of high concentrations of calcium and other polyvalent cations, such as magnesium, without the heretofore noted separation, soaping, or flocculation of material from the drilling fluid.

The water base drilling fluids in which the lubricating additive is employed may be based on fresh water, salt water, saturated salt water, sea water or other water normally used in preparing water base drilling fluids containing polyvalent cations. The polyvalent cations may be inherently present in the water, for example, in sea water which contains approximately 1,200 ppm magnesium ions and 400 ppm calcium ions or dissolved in the fluid, such as from the surrounding substrate formation. Greasing out of the lubricating composition does not occur as a result of polyvalent cation contamination, and accordingly addition of suitable prior art dispersants are not necessary.

The improved drilling fluids of this invention can be prepared before drilling of the well commences or conventional water base drilling fluids can be treated to obtain the improved drilling fluids of this invention while drilling is in progress. It is only necesary to obtain a stable dispersion of the lubricating composition in the water base drilling fluid. This is easily accomplished by mixing the lubricating composition with the drilling fluid in a fluid mud mixer along with other materials used to make up the drilling fluid. Circulation of the drilling fluid down the drill pipe and back to the mud pits will accomplish the desired dispersion of the lubricating composition.

As discussed above, the lubricating composition may contain a pour point depressant as well as other additives which do not affect the basic and novel characteristics of the inventive compositions. These additives should be employed in amounts from 0% to 30% by weight. Suitable pour point depressants are selected from the lower alcohols; such as methanol, ethanol, n-propanol, isopropanol, n-butanol, isobutanol, ethylene glycol, butylene glycol and propylene glycol.

The mechanism by which the lubricating composition improves the lubricity of water base drilling fluids is not completely understood. Upon mixing these materials in a water base drilling fluid, they become dispersed as discrete, small droplets. An emulsion is not formed since the droplets are much larger than the colloidal droplets required for an emulsion. Apparently, the combination of alkanolamides of a saturated and unsaturated fatty acid produces a droplet which is readily available for absorption on and coating of a metal surface. Such a droplet apparently has more affinity for a metal surface than does an emulsified droplet which has a greater affinity for the water in which it is dispersed.

The following examples are given to illustrate the invention but are not deemed to be limiting thereof. All percentages given are based upon weight unless otherwise indicated.

EXAMPLE 1

Three separate water base drilling fluid samples were prepared by mixing for 20 minutes 15 grams of Wyoming bentonite clay in 350 milliliters tap water. Four grams of two separate lubricant compositions were added to two separate samples. All samples were then mixed for 15 minutes on a MULTIMIXER ™. The results are given in Table I.

The Run 1 inventive composition was prepared by slowly adding 10 grams of diethanolamine to 90 grams of heated soybean oil. The mixture was stirred and heated for 30 minutes after it reached a temperature between 350° F. and 400° F. The composition was then cooled to room temperature and mixed with a conventionally prepared coconut oil/diethanolamine reaction product identified as ACTIVE ®-4 and manufactured by Blew Chemical Company.

The Run B comparative composition was prepared as above except 83 grams of soybean oil was mixed with 17 grams diethanolamine.

The results from Run 1 indicate the formation of an acceptable lubricating composition when the composition contains 8% to 13% by weight diethanolamine.

The Run 1 results also indicate that no flocculating occurs and that the API Filtrate remains essentially the same. Comparative Run B, however, demonstrates unacceptable flocculation of mud solids and increased API Filtrate when the reactant contains higher than acceptable amine concentrations.

TABLE I

|  | Comparative Runs | | Inventive Run |
|---|---|---|---|
|  | A | B | 1 |
| Drilling Fluid, ml | 350 | 350 | 350 |
| Lubricant Additive, gms | 0 | 4 | 4 |
| Plastic Viscosity, cp | 10 | 17 | 13 |
| Yield Point, lb/100 sq ft | 6 | 17 | 3 |
| 10 sec Gel, 10/100 sq ft | 1 | 4 | 0 |
| 10 min Gel, lb/100 sq ft | 5 | 10 | 6 |
| API Filtrate, ml | 11.2 | 14.2 | 12.6 |

EXAMPLE 2

In Run C, a water base drilling fluid was prepared from 0.5 grams lime and 350 milliliters of tap water and treated with 4 grams of a commercially available lubricant containing approximately 61% alkanolamine/coconut oil and 31% isoparaffin as a solvent. A greasy, insoluble soap immediately formed.

In Run 2, essentially no greasy material formed after adding to the above drilling fluid 4 grams of a composition containing 80.75% by weight of diethanolamine/soybean oil, 4.25% by weight commercially prepared diethanolamine/coconut oil, and 15% by weight isopropyl alcohol as a pour point depressant and solvent.

EXAMPLE 3

Four different water base drilling fluids were prepared by mixing the following materials in the stated amounts:

Sea Water Drilling Fluid 36 grams of Western bentonite clay was added to 350 milliliters tap water and stirred for five minutes. Four grams ferrochrome-lignosulfonate and 0.4 grams sodium hydroxide was added and stirred for five minutes. 87.5 milliliters of the mix was added to 262.5 milliliters of sea water and then 60 grams Glen Rose shale was added to the water mix and stirred an additional five minutes.

Lime-Lignite Drilling Fluid

Ten grams Wyoming bentonite and 60 grams Glen Rose shale were mixed in 350 milliliters tap water for 15 minutes. 10 grams lignite, 2 grams sodium hydroxide and 4 grams lime were added and stirred an additional five minutes.

Ferrochrome-Lignofulfonate Drilling Fluid 20 grams Western bentonite and 60 grams Glen Rose shale were added to 350 ml tap water and mixed 15 minutes. 4 grams ferrochrome-lignosulfonate and 0.4 grams sodium hydroxide were added and stirred for 10 minutes.

West Texas Brine Drilling Fluid

Twenty grams attapulgite clay was added to 350 ml of West Texas Brine (saturated salt water having an 86 ppm total hardness) and stirred for 10 minutes.

The lubricant compositions described below were added to the drilling fluids in the amounts set forth in Tables II and III, stirred for 15 minutes and rolled at 150° F. for 16 hours to permit complete mixing and hydration. The lubricity coefficients were taken according to Appendix B, RP 13B of API Recommended Practice, Standard Procedure for Testing Drilling Fluids, 6th Edition, April 1976. Inventive Runs 3, and 4 employed a lubricating composition containing a mixture of 80.75% diethanolamine/soybean oil, 4.25% diethanolamine/coconut oil, and 15% isopropyl alcohol. Comparative Runs D and F employed a commercially available lubricating composition containing 65% soybean oil, 5% sulfated soybean oil, 10% NEODOL® 25, and 20% isopropanol. Comparative Runs E and G employed a commercially available lubricating composition described in Example 2, Run C.

The results set forth in Table II clearly demonstrate the enhanced lubricating properties of the novel compositions of this invention in the presence of polyvalent cations in different drilling fluids. The results set forth in Table III demonstrate the enhanced lubricating properties of the novel compositions of this invention even after addition of polyvalent cations, which addition simulates actual drilling conditions. Note, however, that the lubricating properties of both comparative formulations were completely lost under identical conditions.

The invention being thus described, it will be obvious that the same may be varied in many ways. Such variations are not to be regarded as a departure from the spirit and scope of the invention, and all such modifications are intended to be included within the scope of the following claims.

TABLE II

| Sample Drilling fluid Weight, bbl* | Sea Water Fluid | | | | Lime-Lignite Fluid | | | | Ferrochrome-Lignosulfonate Fluid | | | | West Texas Brine | | | |
|---|---|---|---|---|---|---|---|---|---|---|---|---|---|---|---|---|
|  | 1.0 | | | | 1.0 | | | | 1.0 | | | | 1.0 | | | |
| Inventive Run 3, lb | 0 | 4 | 0 | 0 | 0 | 4 | 0 | 0 | 0 | 4 | 0 | 0 | 4 | 4 | 0 | 0 |
| Comparative Run D, lb | 0 | 0 | 4 | 0 | 0 | 0 | 4 | 0 | 0 | 0 | 4 | 0 | 0 | 0 | 4 | 0 |
| Comparative Run E, lb | 0 | 0 | 0 | 4 | 0 | 0 | 0 | 4 | 0 | 0 | 0 | 4 | 0 | 0 | 0 | 4 |
| Lubricity Coefficient | .26 | .09 | .11 | .12 | .23 | .16 | .20 | .22 | .22 | .16 | .17 | .18 | .22 | .11 | .17 | .17 |

*Pounds per barrel containing 42 gallons

TABLE III

| Sample Drilling fluid weight, bbl* | Sea Water Fluid | | | | Ferrochrome-Lignosulfonate Fluid | | | |
|---|---|---|---|---|---|---|---|---|
|  | 1.0 | | | | 1.0 | | | |
| Inventive Run 4, lb | 0 | 4 | 0 | 0 | 0 | 4 | 0 | 0 |

TABLE III-continued

| Sample Drilling fluid weight, bbl* | Sea Water Fluid | | | | Ferrochrome-Lignosulfonate Fluid | | | |
|---|---|---|---|---|---|---|---|---|
| | 1.0 | | | | 1.0 | | | |
| Comparative Run F, lb | 0 | 0 | 4 | 0 | 0 | 0 | 4 | 0 |
| Comparative Run G, lb | 0 | 0 | 0 | 4 | 0 | 0 | 0 | 4 |
| Lime, lb | 0 | 4 | 4 | 4 | 0 | 4 | 4 | 4 |
| Lubricity Coefficient | .26 | .15 | .25 | .25 | .22 | .16 | .20 | .20 |

*Pounds per barrel containing 42 gallons

The invention being thus described, it will be obvious that the same may be varied in many ways. Such variations are not to be regarded as a departure from the spirit and scope of the invention, and all such modifications are intended to be included within the scope of the following claims.

What is claimed is:

1. A water base drilling fluid having enhanced lubricating properties in the presence of polyvalent cation, comprising a mixture of water clay, and a lubricant mixture consisting essentially of:
   about 1–10 wt. % of an alkanol amide of a saturated fatty acid reaction product of an amine selected from the group consisting of mono- and di-substituted amines having $C_1$–$C_{10}$ range mono- and di-alkanol substituents, and mixtures thereof, and a reactant selected from the group consisting of $C_8$–$C_{20}$ range saturated fatty acids, triglycerides of $C_8$–$C_{20}$ range fatty acids wherein at least 50% of the fatty acids are saturated, and mixtures thereof;
   about 60–99 wt. % of an alkanol amine of an unsaturated fatty acid reaction product of about 8–13 wt. % amine selected from the group consisting of mono- and di-substituted amines having $C_1$–$C_{10}$ range mono- and di-alkanol substituents, and mixtures thereof, and about 92 to 87 wt. % of a reactant selected from the group consisting of $C_{16}$–$C_{18}$ range unsaturated fatty acids, triglycerides of $C_{16}$–$C_{18}$ unsaturated fatty acids, and mixtures thereof; and
   about 0–30 wt. % of a pour point depressant selected from the group consisting of methanol, ethanol, n-propanol, isopropanol, n-butanol, isobutanol, ethylene glycol, butylene glycol, propylene glycol, and mixtures thereof; wherein the alkanol amine radical concentration is in the range of about 5–15 wt. % of said lubricant mixture.

2. The drilling fluid of claim 1 wherein:
said lubricant mixture comprises about 2–5 wt. % alkanolamide of saturated fatty acid and about 98–95 wt. % of alkanol amide of unsaturated fatty acid, and wherein the alkanol amine radical concentration is in the range of about 7–10 wt. % of said lubricant mixture.

3. The drilling fluid of claim 1 wherein the alkanolamide of saturated fatty acid is selected from the group consisting of the alkanolamide of coconut oil, palm kernel oil and mixtures thereof, wherein the alkanolamide of unsaturated fatty acid is selected from the group consisting of the alkanolamide of castor oil, soybean oil, cotton seed oil, sunflower oil, corn oil, olive oil, palm oil, peanut oil, linseed oil, tall oil and mixtures thereof.

4. The drilling fluid of claim 3 wherein the alkanol amine reactant is diethanol amine.

5. The drilling fluid of claim 1 wherein the unsaturated fatty acid is tallow, lard or cod liver oil.

6. The drilling fluid of claim 1 wherein the unsaturated alkanolamide is diethanolamide of coconut oil.

7. The drilling fluid of claim 1 wherein the unsaturated alkanolamide is diethanolamide of soybean oil.

8. A lubricating composition for water base drilling fluid consisting essentially of:
   (a) 1% to 10% by weight of an alkanolamide of saturated fatty acid reaction product of an amine selected from the group consisting of mono- and di-substituted amines having $C_1$–$C_{10}$ range mono- and di-alkanol substituents and mixtures thereof, and a reactant selected from the group consisting of $C_8$–$C_{20}$ range saturated fatty acids, triglycerides of $C_8$–$C_{20}$ range fatty acids wherein at least 50% of the fatty acids are saturated, and mixtures thereof;
   (b) 60% to 90% by weight of an alkanolamide of unsaturated fatty acid reaction product of about 8–13 wt. % amine selected from the group consisting of mono- and di-substituted amines having $C_1$–$C_{10}$ range mono- and di-alkanol substituents, and mixtures thereof, and of about 92 to 87 wt. % of a reactant selected from the group consisting of $C_{16}$–$C_{18}$ range unsaturated fatty acids, triglycerides of $C_{16}$–$C_{18}$ unsaturated fatty acids, and mixtures thereof; and
   (c) 0% to 30% by weight of a pour point depressant selected from the group consisting of methanol, ethanol, n-propanol, isopropanol, n-butanol, isobutanol, ethylene glycol, butylene glycol, propylene glycol, and mixtures thereof;
   wherein the alkanol amine radical concentration is in the range of about 5–15 wt. % of said lubricant mixture.

9. The composition of claim 8 wherein the alkanolamide of saturated fatty acid is in the range of 2% to 5% and wherein the alkanolamide of unsaturated fatty acid is in the range of 98% to 95%.

10. The composition of claim 8 wherein the alkanolamide of saturated fatty acid is in the range of 4% to 5%; wherein the alkanolamide of unsaturated fatty acid is in the range of 75% to 86%; and wherein the pour point depressant is in the range of 10 to 20%.

11. The composition of claim 8 wherein the alkanolamide of saturated fatty acid is an alkanolamide of coconut oil, and wherein the alkanolamide of unsaturated fatty acid is in alkanolamide of soybean oil.

12. In line one, omit the numeral and substitute the numeral 11 therefor.

13. In a process for drilling a well with a rotary bit which comprises forming a borehole with said bit while circulating through said bit and through said borehole, in contact with the walls thereof, a water base drilling fluid;
   the improvement comprising:
   employing about 4 lb. per barrel of drilling fluid of a lubricant consisting essentially of:
   about 1–10 wt. % of an alkanolamide of saturated fatty acid reaction product of an amine selected from the group consisting of mono- and di-substituted amines having $C_1$–$C_{10}$ range mono- and di-alkanol substituents, and mixtures thereof, and of a reactant selected from the group consisting of $C_8$–$C_{20}$ range saturated fatty acids, triglycerides of $C_8$–$C_{20}$ range fatty acids wherein at least 50% of the fatty acids are saturated, and mixtures thereof;
   about 60% to 90% by weight of an alkanolamide of unsaturated fatty acid reaction product of about 8-13 wt. % amine selected from the group consisting of mono- and di-substituted amines having $C_1$-$C_{10}$ range mono- and di-alkanol substituents, and mixtures thereof and of about 92 to 87 wt. % of a reactant selected from the group consisting of $C_{16}$-$C_{18}$ range unsaturated fatty acids, triglycerides of $C_{16}$-$C_{18}$ unsaturated fatty acids, and mixtures thereof; and about 0 to 30% by weight of a pour point depressant selected from the group consisting of methanol, ethanol, n-propanol, isopropanol, n-butanol, isobutanol, ethylene glycol, butylene glycol, propylene glycol, and mixtures thereof:

wherein the alkanol amine radical concentration is in the range of about 5-15 wt. % of said lubricant mixture.

14. The process of claim 13 wherein the saturated alkanolamide is diethanolamide of coconut oil.

15. The process of claim 13 wherein the unsaturated alkanolamide is diethanolamide of soybean oil.

* * * * *

UNITED STATES PATENT AND TRADEMARK OFFICE
CERTIFICATE OF CORRECTION

PATENT NO. : 4,280,915

DATED : July 28, 1981

INVENTOR(S) : James D. Kercheville

It is certified that error appears in the above—identified patent and that said Letters Patent is hereby corrected as shown below:

Claim 1, Col. 7, line 34:

Omit the word "amine" and substitute the word "amide" therefor.

Claim 12, Col. 8, line 48-49:

Omit the phrase "In line one, omit the numeral and substitute the numeral 11 therefor." and substitute the phrase "The composition of claim 11 wherein the saturated alkanolamide is diethanolamide of coconut oil and the unsaturated alkanolamide is diethanolamide of soybean oil."

Signed and Sealed this

Fourth Day of September 1984

[SEAL]

Attest:

Attesting Officer

GERALD J. MOSSINGHOFF

Commissioner of Patents and Trademarks